US009463812B2

(12) United States Patent
Govindappa et al.

(10) Patent No.: US 9,463,812 B2
(45) Date of Patent: Oct. 11, 2016

(54) FILTRATION SYSTEM AND METHOD FOR ENGINE AIR INTAKE

(71) Applicant: General Electric Company, Schenectady, NY (US)

(72) Inventors: Suresh Rama Reddy Govindappa, Lawrence Park, PA (US); Lamar K Ledbetter, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/278,342

(22) Filed: May 15, 2014

(65) Prior Publication Data

US 2014/0245920 A1    Sep. 4, 2014

Related U.S. Application Data

(62) Division of application No. 13/178,761, filed on Jul. 8, 2011, now abandoned.

(51) Int. Cl.

| | |
|---|---|
| *B01D 46/00* | (2006.01) |
| *B61C 3/00* | (2006.01) |
| *F02M 35/02* | (2006.01) |
| *F02M 35/08* | (2006.01) |
| *F02M 35/16* | (2006.01) |
| *F02M 35/024* | (2006.01) |
| *F02M 35/09* | (2006.01) |
| *B61C 9/38* | (2006.01) |

(52) U.S. Cl.
CPC ............... *B61C 3/00* (2013.01); *B01D 46/002* (2013.01); *B01D 46/0023* (2013.01); *B01D 46/0058* (2013.01); *B01D 46/0079* (2013.01); *B61C 9/38* (2013.01); *F02M 35/0215* (2013.01); *F02M 35/02475* (2013.01); *F02M 35/082* (2013.01); *F02M 35/086* (2013.01); *F02M 35/09* (2013.01); *F02M 35/164* (2013.01); *B01D 2279/60* (2013.01)

(58) Field of Classification Search
CPC .............................. B01D 46/02; B01D 46/10
USPC ........... 95/20; 96/74, 150; 55/301–302, 523, 55/419, 474
See application file for complete search history.

(56) References Cited

U.S. PATENT DOCUMENTS

| | | | | |
|---|---|---|---|---|
| 6,077,490 A | * | 6/2000 | McIlroy | B01D 46/002 423/215.5 |
| 6,830,599 B1 | * | 12/2004 | McCutchen | B01D 46/0058 15/352 |
| 2003/0182910 A1 | * | 10/2003 | Pikesh | F02M 35/022 55/396 |

FOREIGN PATENT DOCUMENTS

WO        0074818 A1      12/2000

OTHER PUBLICATIONS

Australian Examination Report issued in connection with corresponding AU Application No. 2012283006 on Jun. 1, 2016.

*Primary Examiner* — Jason M Greene
*Assistant Examiner* — Karla Hawkins
(74) *Attorney, Agent, or Firm* — GE Global Patent Operation

(57) ABSTRACT

There is provided a method of filtration for a rail vehicle or other off-highway powered system. The method includes determining a filter load of a primary filtration system to an air intake of an engine. The method also includes determining that the filter load exceeds a specified threshold. Additionally, the method includes deactivating the primary filtration system. The method further includes activating a secondary filtration system to the engine.

14 Claims, 6 Drawing Sheets

300

FILTRATION SYSTEM AND METHOD FOR ENGINE AIR INTAKE

BACKGROUND

Exemplary embodiments of the invention relate generally to a system and method for filtering sand and/or other solid particles from an engine air intake. Moreover, such exemplary embodiments may relate to improving the air quality for engines operating in desert conditions.

A locomotive is powered along rails by a locomotive truck, which includes the motor and wheels. The locomotive truck is typically electrically powered, with the electric power being supplied by an onboard engine. The onboard engine includes an air intake system. Other powered systems may also include engines with air intake systems.

An air intake is typically engineered and tuned to provide efficiency and power. An air intake system typically increases the velocity of the air until it travels into a combustion chamber, while minimizing turbulence and restriction of flow.

Deserts and other dusty environments provide challenges for air intake systems. The amount of sand that is typical in a desert environment may greatly restrict the flow of air into the engine. Accordingly, an improved technique for air intake in a desert environment may be desirable.

BRIEF DESCRIPTION

In an embodiment, a method comprises determining a filter load of a primary filtration system to an air intake of an engine. The method also includes determining that the filter load exceeds a specified threshold. Additionally, the method includes deactivating the primary filtration system. The method further includes activating a secondary filtration system to the engine.

In another embodiment, a filtration system comprises a primary filtration system, a secondary filtration system, two or more sync doors, and a blower. The primary filtration system may be configured to filter solid particles from an intake air flow to an engine during a primary mode. The secondary filtration system may be configured to filter the solid particles from the intake air flow during a secondary mode.

The sync doors may be configured to alternate the filtration system between the primary mode and the secondary mode. The blower may be configured to remove solid particles from the primary filtration system during the secondary mode.

In another embodiment, a tangible, machine-readable medium stores machine-readable instructions executable by a processor, that, when executed by the processor, determine a filter load of a primary filtration system to an air intake of an engine.

The tangible, machine-readable medium may also include machine-readable instructions that, when executed by the processor, determine that the filter load exceeds a specified threshold. The tangible, machine-readable medium may also include machine-readable instructions that, when executed by the processor, deactivate the primary filtration system. Additionally, the tangible, machine-readable medium may also include machine-readable instructions that, when executed by the processor, activate a secondary filtration system to the locomotive engine.

DRAWINGS

These and other features, aspects, and advantages of embodiments of the invention will become better understood when the following detailed description is read with reference to the accompanying drawings in which like characters represent like parts throughout the drawings, wherein.

DETAILED DESCRIPTION

Embodiments of the invention relate to systems and methods for filtering sand, dust, and/or other solid particles from intake air and/or cooling air to be supplied to an engine or motor. Some embodiments are described herein with respect to locomotives and other rail vehicles. However, other embodiments are applicable to off-highway powered systems generally. An off-highway powered system is a system that includes an engine(s) and/or motor(s) for power generation, which is not for use on roads designated for primary use by automobiles. Examples include trains and other rail vehicles, marine vessels, 100+ ton mining haul trucks, and other heaving mining or construction equipment, stationary generator sets, and the like.

Further, some embodiments of the invention are described herein with respect to sand filtration. According to one aspect, "sand" refers to solid rock and/or mineral particles at or greater than 0.0625 mm in diameter, e.g., in a range of 0.0625 mm to 2 mm diameter. It should be noted that other embodiments may be additionally or alternatively applicable to dust, defined as solid particles less than 0.0625 mm in diameter, e.g., in a range of less than 0.0625 mm and greater than 0.01 mm.

Figure 1A:
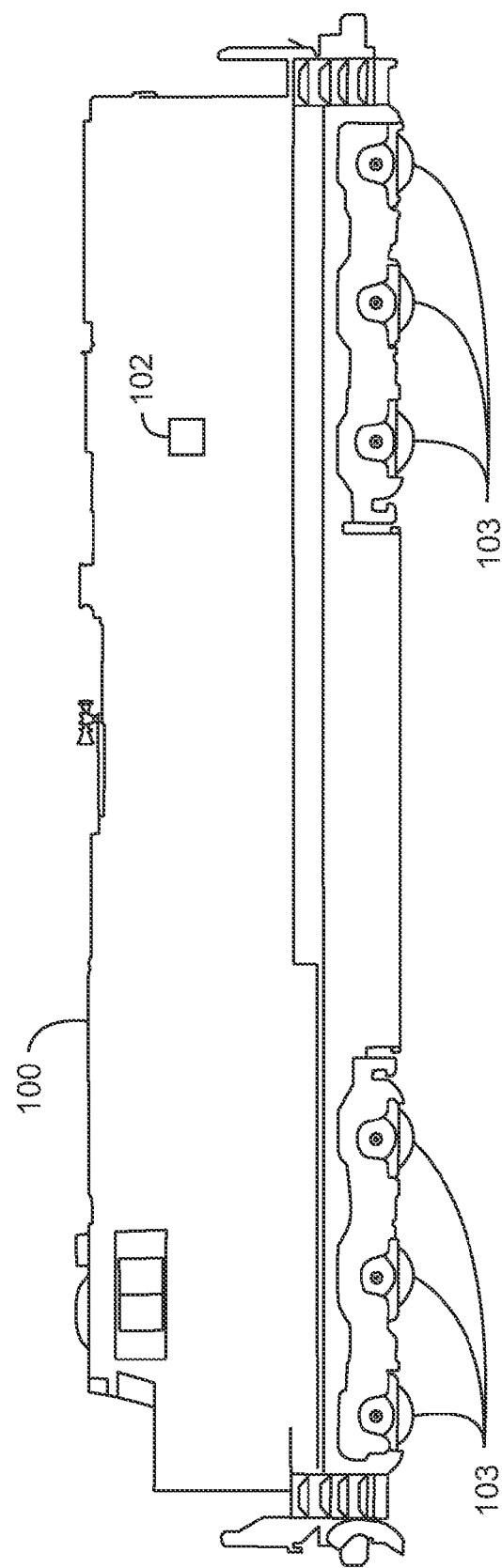
FIG. 1A is a block diagram of a rail vehicle (e.g., locomotive) according to an exemplary embodiment of the invention.

FIG. 1A is a block diagram of a diesel-electric locomotive 100 that may employ a filtration system according to an exemplary embodiment of the invention. A plurality of traction motors, not visible in FIG. 1, are located behind drive wheels 103 and coupled in a driving relationship to axles. The locomotive may also include an air intake 102.

Figure 1B:
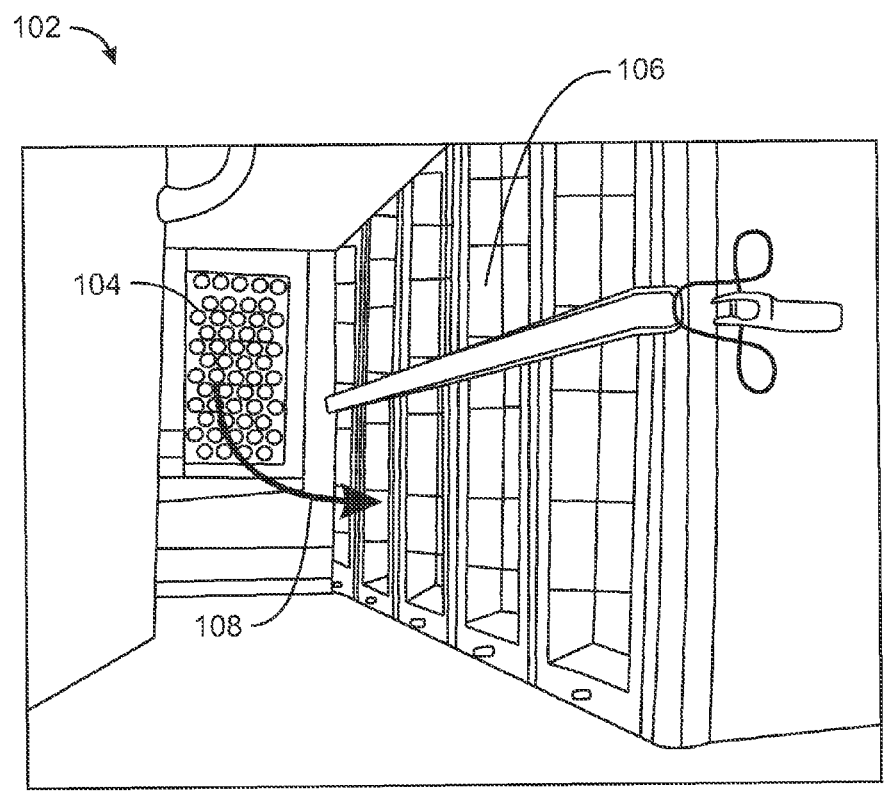
FIG. 1B is a block diagram of an air intake system, according to an exemplary embodiment of the invention.

FIG. 1B is a block diagram of the air intake 102, according to an exemplary embodiment of the invention. The air intake 102 may include a V-screen with spin filters 104 and a primary filtration system such as baggie filters 106. The air flow is represented by the arrow 108. As shown, air first passes through the V-screen and spin filters 104 before passing through the baggie filters 106.

Figure 2A:
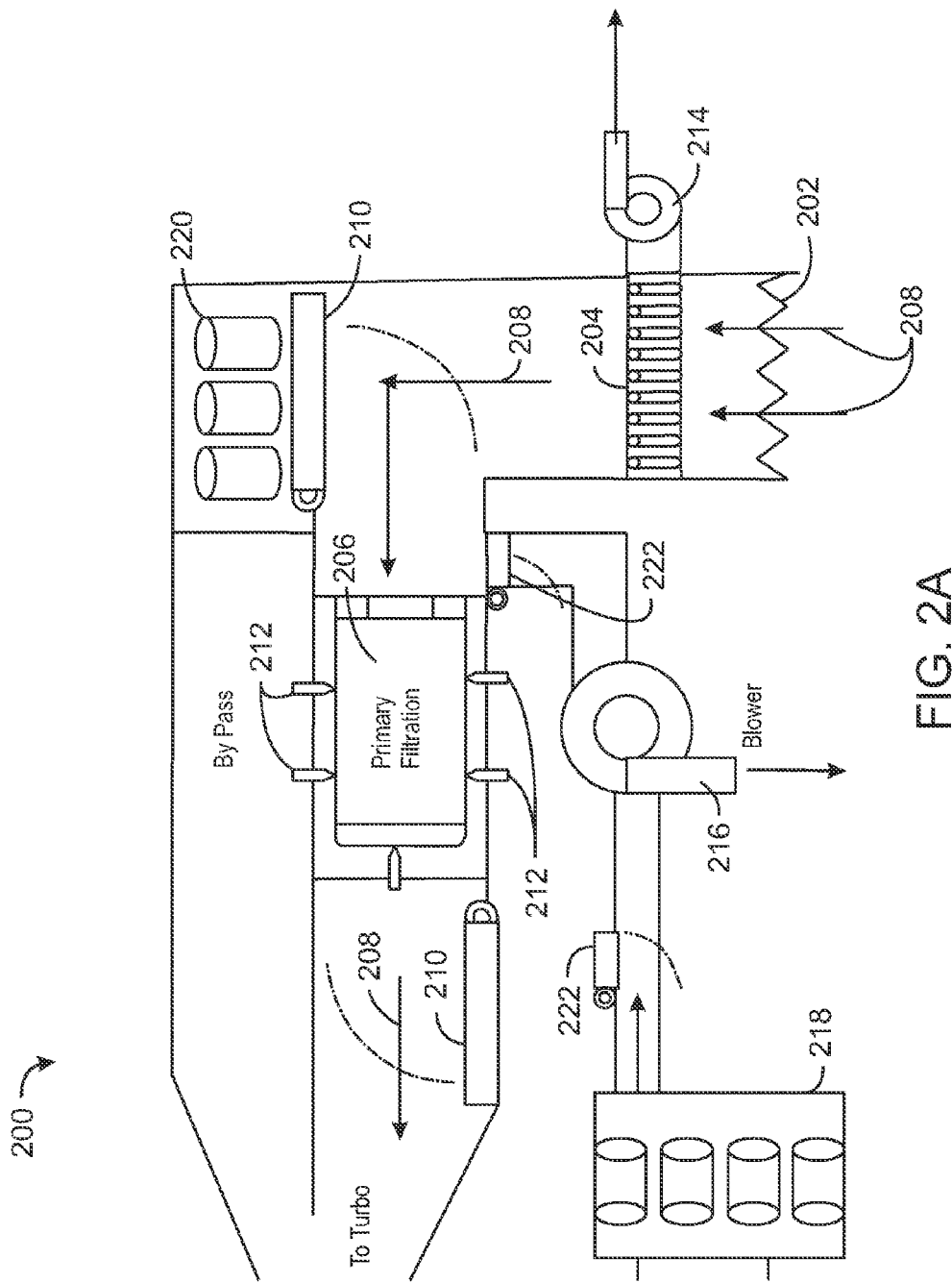
FIG. 2A is a block diagram of a filtration system, according to an exemplary embodiment of the invention.
Figure 2B:
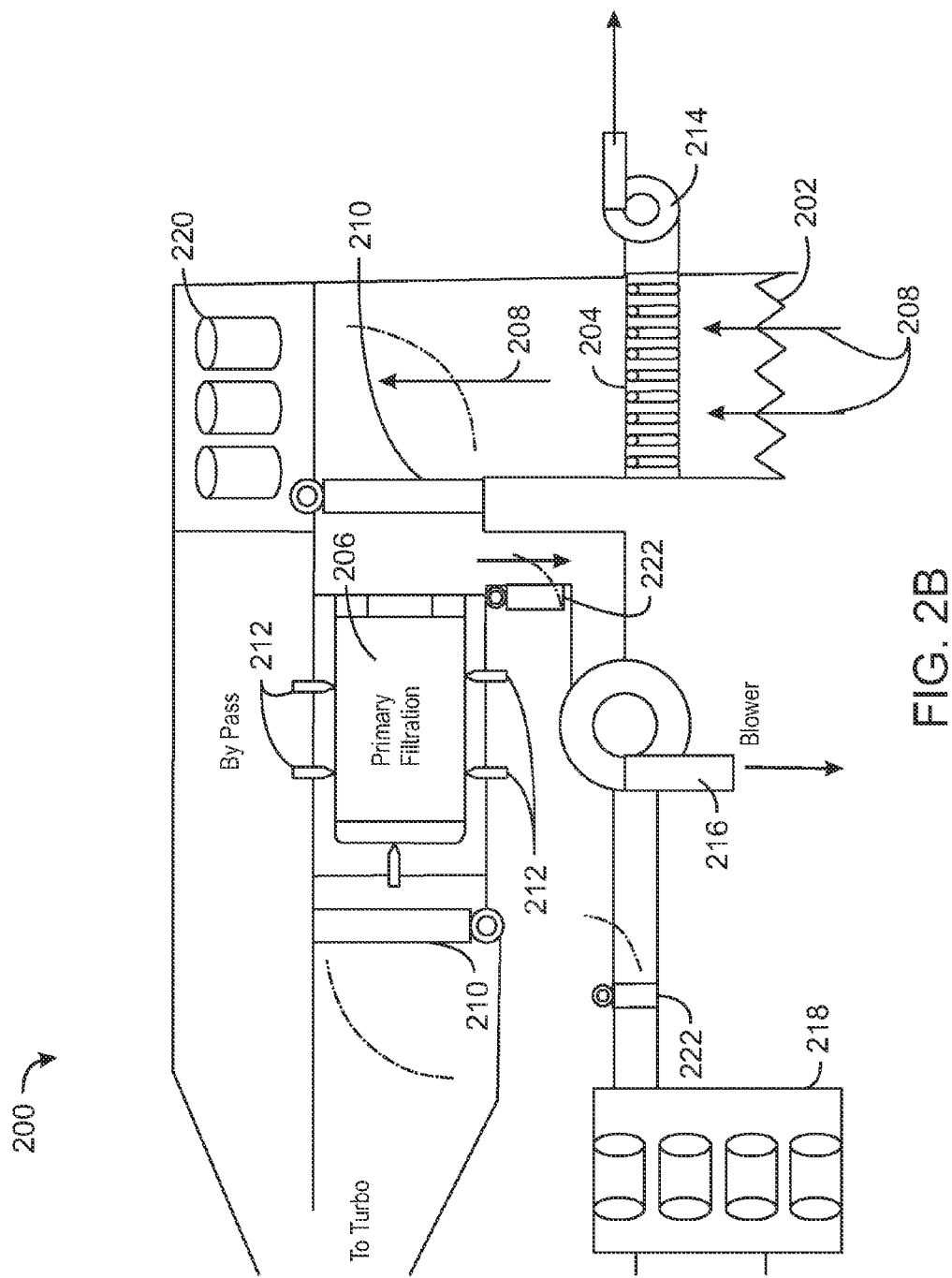
FIG. 2B is a block diagram of a filtration system, according to an exemplary embodiment of the invention.

FIGS. 2A-2B are block diagrams of a filtration system 200, according to an exemplary embodiment of the invention. The filtration system 200 may operate in two modes: a primary filtration mode, and a secondary filtration mode. FIG. 2A shows the primary filtration mode. FIG. 2B shows the secondary filtration mode. The filtration system 200 may be described in four segments: an initial filtration, primary filtration, secondary filtration, and exhaust.

The filtration system 200 includes a V-screen 202, spin filters 204, and an exhaust blower 214. The V-screen 202 and spin filters 204 may provide initial screening of solid particles, e.g., sand, from the air flow 208. The exhaust blower 214 may exhaust sand from the spin filters 204.

The filtration system 200 may also include a primary filtration system 206, compressed air nozzles 212, a blower 216, a secondary filtration system 220, and sync doors 210. According to an aspect of the invention, in the context of referring to two or more doors, sync doors 210 may be arranged or otherwise configured so their positioning can be synchronized or coordinated for achieving a particular function. After passing through V-screen 202 and spin filters 204, the air flow 208 may pass through the primary filtration system 206. The primary filtration system 206 may include air filters, such as baggie filters. The compressed air nozzles 212 may deliver compressed air for blowing sand out of the baggie filters. The sync doors 210 may be used to alternate the air flow 208 between the primary filtration system 206 and the secondary filtration system 220. The secondary filtration system 220 may include air filters, such as canister or baggie filters.

The filtration system 200 may also include a traction motor filtration system 218. The traction motor filtration system 218 may remove sand from the traction motors. The blower 216 may remove the sand accumulated by the primary filtration system 206 and the traction motor filtration system 218. In an exemplary embodiment, the suction created by the blowing may open the exhaust passage doors 222, allowing for the flow of sand to the blower 216.

In one embodiment, the filtration system 200 may be used in extreme dust environments by extending primary mode of filtration for secondary subsystems. In such an embodiment, the blower 216 may be alternated to eliminate sand in both subsystems. In extreme dust environments, the secondary bypass may be used in times of extreme dust.

Figure 3:
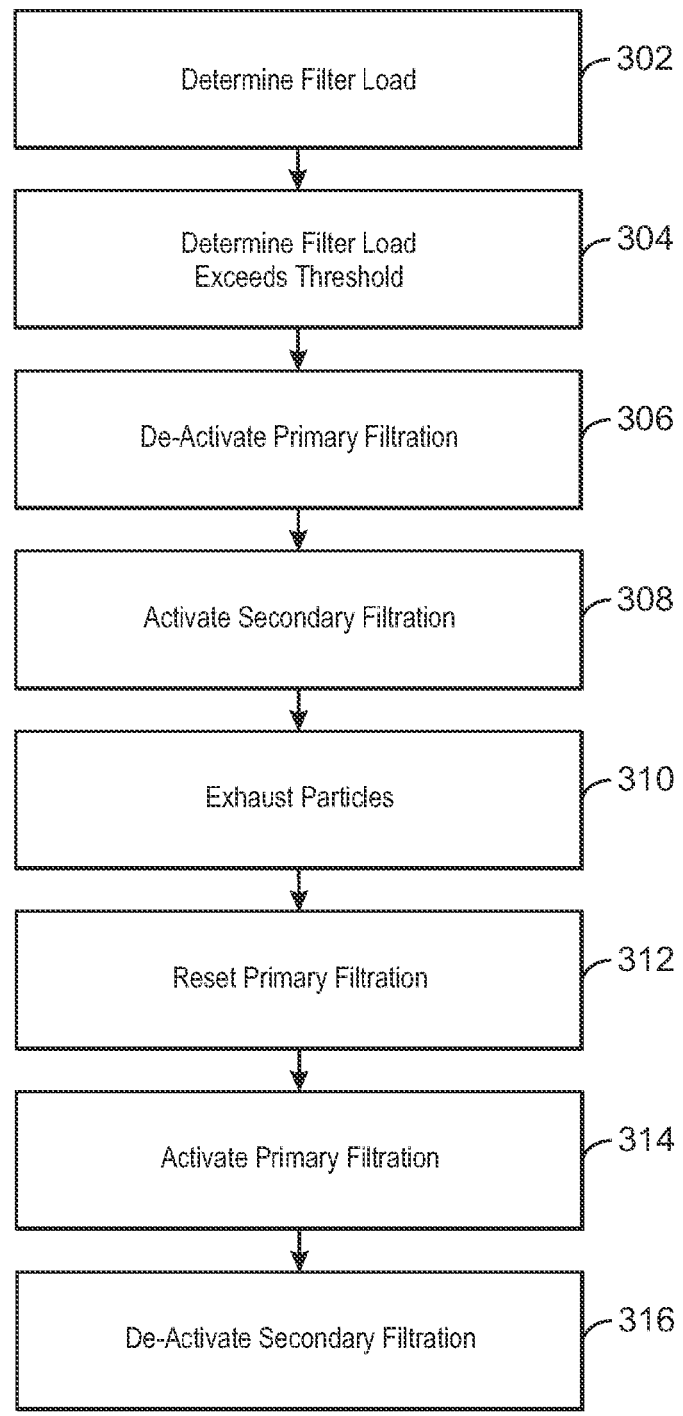
FIG. 3 is a process flow diagram showing a method of filtration, according to an exemplary embodiment of the invention.

FIG. 3 is a process flow diagram showing a method 300 of filtration, according to an exemplary embodiment of the invention. The method is referred to by the reference number 300. The method 300 is described with reference to FIGS. 2A-2B, described above.

The method 300 begins at block 302, where a filter load may be determined. The filter load may be a load on the primary filtration system 206, such as, a pressure differential across the primary filtration system 206. The filter load may correlate inversely to an amount of solid particles clogging the primary filtration system 206. Filter load may be determined using various methods, including optical sensors, electromagnetic radiation-based sensors, etc.

At block 304, it may be determined that the filter load exceeds a specified threshold. The specified threshold may indicate that the pressure differential is too great to efficiently filter sand or other particles using the primary filtration system 206.

Accordingly, at block 306 the primary filtration system 206 may be deactivated. Additionally, at block 308 the secondary filtration system 220 may be activated. In an exemplary embodiment, the sync doors may be move from the positions shown in FIG. 2A to the positions shown in FIG. 2B. This may alternate the air flow 208 from the primary filtration system 206 to the secondary filtration system 220.

Advantageously, air flow to the turbo may continue through the secondary filtration system 220 while the solid particles are removed from the primary filtration system 206. Accordingly, at block 310, the solid particles accumulated by the primary filtration system 206 may be exhausted from the filtration system 200. In an exemplary embodiment, the blower 216 may be activated. The suction created by the blower 216 may change exhaust passage doors 222 from the positions shown in FIG. 2A to the positions shown in FIG. 2B.

Additionally, compressed air may be delivered through the compressed air nozzles 212 to remove solid particles from the primary filtration system 206. The removed particles may also be exhausted by the blower 216.

Once the particles are exhausted by the blower 216, at block 312, the primary filtration system 206 may be reset. The blower 216 may also be deactivated.

Additionally, at block 314, the primary filtration system 206 may be activated. At block 316, the secondary filtration system 220 may be deactivated. In an exemplary embodiment of the invention, the sync doors 210 may be moved from the positions shown in FIG. 2B to the positions shown in FIG. 2A.

Figure 4:
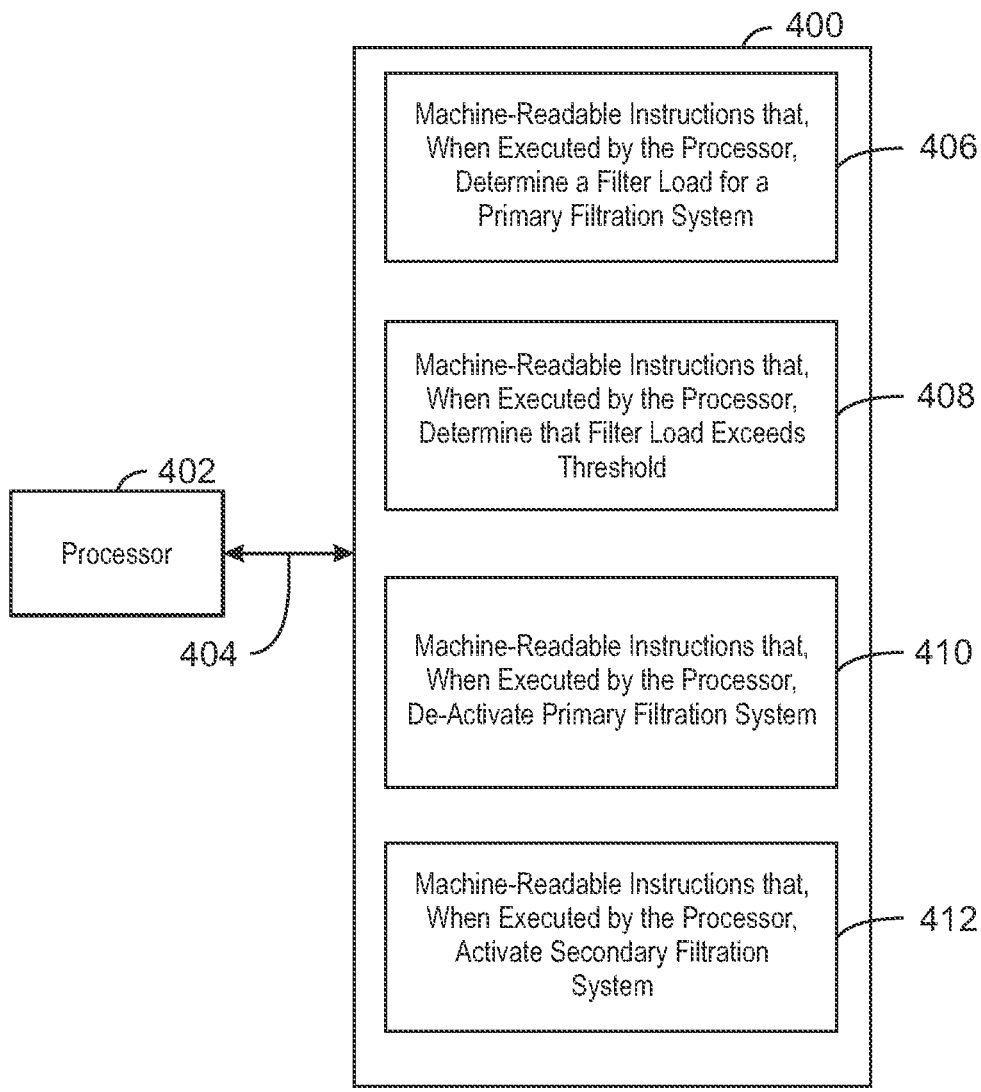
FIG. 4 is a block diagram of a tangible, machine-readable medium that stores code adapted to perform filtration according to an exemplary embodiment of the invention.

FIG. 4 is a block diagram of a tangible, machine-readable medium that stores code adapted to perform filtration according to an exemplary embodiment of the invention. Performing filtration may include expunging trapped solid particles from a filter system. The tangible, machine-readable medium is generally referred to by the reference number 400.

The tangible, machine-readable medium 400 may correspond to any typical storage device that stores computer-implemented instructions, such as programming code or the like. For example, the storage device may include a hard disk drive, a magnetic disk drive, e.g., to read from or write to a removable magnetic disk, and an optical disk drive, e.g., for reading a CD-ROM disk or to read from or write to other optical media.

The storage device may be connected to a system bus by a storage device interface, such as a hard disk drive interface, a magnetic disk drive interface and an optical drive interface.

Although the description of computer-readable media above refers to a hard disk, a removable magnetic disk and a CD-ROM disk, it should be appreciated that other types of media that are readable by a computer system and that are suitable to the desired end purpose may be used, such as magnetic cassettes, flash memory cards, digital video disks, Bernoulli cartridges, and the like.

When read and executed by a processor 402 via a communication path 404, the instructions stored on the tangible, machine-readable medium 400 are adapted to cause the processor 402 to perform filtration according to an exemplary embodiment of the invention, as described herein.

A region 406 of the tangible, machine-readable medium 400 stores machine-readable instructions that, when executed by the processor 402, determine a filter load for a primary filtration system.

A region 408 of the tangible, machine-readable medium 400 stores machine-readable instructions that, when executed by the processor 402, determine that the filter load exceeds a specified threshold.

A region 410 of the tangible, machine-readable medium 400 stores machine-readable instructions that, when executed by the processor 402, deactivate the primary filtration system.

A region 412 of the tangible, machine-readable medium 400 stores machine-readable instructions that, when executed by the processor 402, activate a secondary filtration system.

In an embodiment, a sand filtration system for a rail vehicle (e.g., locomotive) includes a primary filtration system, a secondary filtration system, two or more sync doors, a sand blower, and a controller. The primary filtration system and the secondary filtration system are in parallel fluid communication with an air intake passage and are each configured to filter sand from intake air traveling through the air intake passage. (The air intake passage provides the intake air to an engine of the rail vehicle for combustion.) The two or more sync doors are moveable to a first position and to a different, second position, e.g., each sync door includes a door member and a motor unit for moving the door member. The sand blower is configured to remove sand from the primary filtration system. The controller is operably connected (e.g., directly or indirectly electrically connected) to the sync doors and to the sand blower. The controller is configured to control the sync doors and the sand blower in a primary mode and in a different, secondary mode. In the primary mode, the controller controls the sync doors to the first position; in the first position, the sync doors route the intake air to travel through the primary filtration system and not the secondary filtration system. In the secondary mode, the controller controls the sync doors to the second position; in the second position, the sync doors route the intake air to travel through the secondary filtration system and not the primary filtration system. Additionally, in the secondary mode (but not the primary mode), the controller controls the sand blower to remove sand from the primary filtration system.

In another embodiment, the controller is configured to: deactivate the primary filtration system in the secondary mode of operation; deactivate the secondary filtration system in the primary mode of operation; and/or when transitioning from the secondary mode to the primary mode of operation, re-set the primary filtration system and re-activate the primary filtration system.

In another embodiment, the air intake passage includes first and second distinct, parallel sub-passages. The primary filtration system is disposed in the first sub-passage. The secondary filtration system is disposed in the second sub-passage. The system includes first and second sync doors. The first sync door is movable between blocking an entrance (upstream end) to the second sub-passage (first position) and blocking an entrance (upstream end) to the first sub-passage (second position). The second sync door is moveable between blocking an exit of the first sub-passage (second position) and not blocking the exit of the first sub-passage (first position).

In another embodiment, when the second sync door is in the second position, a sand blower passage is exposed (open), allowing for the expulsion of sand from the system. When the second sync door is in the first position, it blocks the sand blower passage. In another embodiment, the sand blower passage is selectively blocked using a third sync door controllable by the controller.

Another embodiment relates to a method of sand filtration. The method includes determining a filter load of a primary filtration system of an air intake of an engine of an off-highway powered system. The method further includes determining that the filter load exceeds a specified threshold. The method further includes deactivating the primary filtration system (e.g., upon determining that the filter load exceeds the specified threshold). The method further includes activating a secondary filtration system to the air intake of the engine. Sand may be exhausted from the primary filtration system while the primary filtration system is deactivated.

Another embodiment relates to a sand filtration system. The system includes a primary filtration system configured to filter sand from an intake air flow to an engine during a primary mode. The system further includes a secondary filtration system configured to filter sand from the intake air flow during a secondary mode. The system further includes two or more sync doors configured to alternate the filtration system between the primary mode and the secondary mode. The system further includes a sand blower configured to remove sand from the primary filtration system during the secondary mode.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, values, and types of materials described herein are intended to illustrate embodiments of the invention, they are by no means limiting and are exemplary in nature. Other embodiments may be apparent upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A sand filtration system for a vehicle, comprising:
   a primary filtration system;
   a secondary filtration system, wherein the primary filtration system and the secondary filtration system are in parallel fluid communication with an air intake passage and configured to filter sand from intake air traveling through the air intake passage, the air intake passage providing the intake air to an engine for combustion;
   two or more sync doors moveable to a first position and to a different, second position;
   a sand blower configured to remove sand from the primary filtration system; and a controller operably connected to the sync doors and the sand blower, the controller configured to control the sync doors and the sand blower in a primary mode and in a different, secondary mode;

wherein, in the primary mode the controller is configured to the sync doors to the first position, wherein in the first position, the sync doors are configured to route the intake air to travel through the primary filtration system and not the secondary filtration system;

wherein, in the secondary mode, the controller is configured to control the sync doors to the second position, wherein, in the second position, the sync doors are configured to route the intake air to travel through the secondary filtration system and not the primary filtration system; and wherein, in the secondary mode, but not the primary mode, the controller is configured to control the sand blower to remove the sand from the primary filtration system.

2. The sand filtration system of claim 1, wherein:

the controller is configured to determine a filter load of the primary filtration system;

the controller is configured to determine if the filter load exceeds a specified threshold; and the controller is configured to switch from operating in the primary mode to operating in the secondary mode, for the sync doors to route the intake air to travel through the secondary filtration system and not the primary filtration system and the sand blower to remove the sand from the primary filtration system, if the controller has determined that the filter load exceeds the specified threshold.

3. The sand filtration system of claim 2, wherein the controller is further configured, responsive to the sand blower having removed the sand from the primary filtration system, to re-set the primary filtration system, activate the primary filtration system, and deactivate the secondary filtration system, for switching back from operating in the secondary mode to operating in the primary mode.

4. A rail vehicle comprising:

plural drive wheels;

plural traction motors coupled in a driving relationship to axles of the drive wheels; and the sand filtration system of claim 2.

5. The rail vehicle of claim 4, further comprising a compressed air system operably coupled to the sand blower of the sand filtration system to provide compressed air to the sand blower for the sand blower to remove the sand from the primary filtration system.

6. The rail vehicle of claim 4, further comprising a traction motor filtration system operably coupled to the traction motors, wherein the sand filtration system is further configured to exhaust solid particles from the traction motor filtration system simultaneously with removing the sand from the primary filtration system.

7. The sand filtration system of claim 1, wherein the primary filtration system is configured to filter the sand from the intake air traveling through the air intake passage, and the sand blower is configured to remove the sand from the primary filtration system, the sand comprising at least one of solid rock particles in a range of 0.0625 mm to 2 mm diameter or solid mineral particles in a range of 0.0625 min to 2 mm diameter.

8. A sand filtration system for a vehicle, comprising:

an initial filtration system comprising a V-Screen, one or more spin filters, and an exhaust blower;

a primary filtration system;

a secondary filtration system, wherein the primary filtration system and the secondary filtration system are in parallel fluid communication with an air intake passage screened by the initial filtration system and are configured to filter sand from intake air traveling through the air intake passage, the air intake passage providing the intake air to an engine for combustion;

two or more sync doors moveable to a first position and to a different, second position;

a traction motor filtration system;

an exhaust passage selectively fluidly coupled to the traction motor filtration system and the primary filtration system by first and second exhaust passage doors, respectively;

a sand blower fluidly coupled to the exhaust passage and configured to remove sand from the primary filtration system and from the traction motor filtration system; and a controller operably connected to the sync doors, the sand blower, and the exhaust passage doors, the controller configured to control the sync doors and the sand blower in a primary mode and in a different, secondary mode;

wherein the initial filtration system is configured to initially screen sand from the intake air prior to the intake air reaching the primary filtration system and the secondary filtration system;

wherein, in the primary mode the controller is configured to control the sync doors to the first position, wherein in the first position, the sync doors are configured to route the intake air to travel through the primary filtration system and not the secondary filtration system;

wherein, in the secondary mode, the controller is configured to control the sync doors to the second position, wherein, in the second position, the sync doors are configured to route the intake air to travel through the secondary filtration system and not the primary filtration system;

wherein, in the secondary mode, but not the primary mode, the controller is configured to control the second exhaust passage door to fluidly couple the exhaust passage with the primary filtration system and to control the sand blower to remove the sand from the primary filtration system; and wherein the controller is further configured to control the first exhaust passage door to fluidly couple the exhaust passage with the traction motor filtration system and to concurrently control the sand blower to remove sand from the traction motor filtration system.

9. The sand filtration system of claim 8, wherein:

the controller is configured to determine a filter load of the primary filtration system;

the controller is configured to determine if the filter load exceeds a specified threshold; and the controller is configured to switch from operating in the primary mode to operating in the secondary mode, for the sync doors to route the intake air to travel through the secondary filtration system and not the primary filtration system and the sand blower to remove the sand from the primary filtration system, if the controller has determined that the filter load exceeds the specified threshold.

10. The sand filtration system of claim 9, wherein the controller is further configured, responsive to the sand blower having removed the sand from the primary filtration system, to re-set the primary filtration system, activate the primary filtration system, and de-activate the secondary filtration system, for switching back from operating in the secondary mode to operating in the primary mode.

11. A rail vehicle comprising:
   plural drive wheels;
   plural traction motors coupled in a driving relationship to axles of the drive wheels; and
   the sand filtration system of claim 9.

12. The rail vehicle of claim 11, further comprising a compressed air system operably coupled to the sand blower of the sand filtration system to provide compressed air to the sand blower for the sand blower to remove the sand from the primary filtration system.

13. The sand filtration system of claim 8, wherein the primary filtration system is configured to filter the sand from the intake air traveling through the air intake passage, and the sand blower is configured to remove the sand from the primary filtration system, the sand comprising at least one of solid rock particles in a range of 0.0625 mm to 2 mm diameter or solid mineral particles in a range of 0.0625 mm to 2 mm diameter.

14. A sand filtration system for a vehicle, comprising:
   an initial filtration system;
   a primary filtration system;
   a secondary filtration system, wherein the primary filtration system and the secondary filtration system are in parallel fluid communication with an air intake passage screened by the initial filtration system and configured to filter sand from intake air traveling through the air intake passage, the air intake passage providing the intake air to an engine for combustion;
   two or more sync doors moveable to a first position and to a different, second position;
   a sand blower configured to remove sand from the primary filtration system; and
   a controller operably connected to the sync doors and the sand blower, the controller configured to control the sync doors and the sand blower in a primary mode and in a different, secondary mode;
   wherein the initial filtration system is configured to initially screen sand from the intake air prior to the intake air reaching the primary filtration system and the secondary filtration system;
   wherein, in the primary mode the controller is configured to control the sync doors to the first position, wherein in the first position, the sync doors are configured to route the intake air to travel through the primary filtration system and not the secondary filtration system;
   wherein, in the secondary mode, the controller is configured to control the sync doors to the second position, wherein, in the second position, the sync doors are configured to route the intake air to travel through the secondary filtration system and not the primary filtration system; and
   wherein, in the secondary mode, but not the primary mode, the controller is configured to control the sand blower to remove the sand from the primary filtration system.

\* \* \* \* \*